United States Patent

Balch

[15] 3,688,430
[45] Sept. 5, 1972

[54] FISHING LURE
[72] Inventor: Duane C. Balch, 4976 Hames Drive, Concord, Calif. 94521
[22] Filed: Oct. 2, 1970
[21] Appl. No.: 77,547

[52] U.S. Cl. .................43/42.06, 43/41, 43/42.1, 43/42.36
[51] Int. Cl. ...A01k 85/00, A01k 97/02, A01k 97/04
[58] Field of Search.............43/42.06, 41, 44.99

[56] References Cited

UNITED STATES PATENTS

| 3,434,230 | 3/1969 | Littlefield | 43/42.06 |
|---|---|---|---|
| 2,797,517 | 7/1957 | Eriksen | 43/42.06 |
| 2,718,086 | 9/1955 | Miner | 43/42.06 |
| 3,413,749 | 12/1968 | Jeffers | 43/42.06 |
| 2,590,461 | 3/1952 | Rasch | 43/42.1 |
| 534,506 | 2/1895 | Hastings | 43/42.1 |

FOREIGN PATENTS OR APPLICATIONS

| 68,217 | 10/1957 | France | 43/42.06 |

*Primary Examiner*—Samuel Koren
*Assistant Examiner*—J. F. Pitrelli
*Attorney*—Limbach, Limbach & Sutton

[57] ABSTRACT

A fishing lure having an easily openable normally closed bait bag. The bag is a hollow flexible body having a longitudinal slit so that axially inward pressure on the ends thereof opens the bag for insertion or removal of bait. In one alternative embodiment snap-resistant barb recesses in the bag are provided. In further alternative embodiments a frangible capsule containing bait is provided in the bait bag for use in survival kits or the like.

8 Claims, 10 Drawing Figures

PATENTED SEP 5 1972 3,688,430

INVENTOR.
DUANE C. BALCH
BY
Limbach, Limbach & Sutton
ATTORNEYS

INVENTOR.
DUANE C. BALCH
BY
Limbach, Limbach & Sutton
ATTORNEYS

FISHING LURE

BACKGROUND OF THE INVENTION

The invention relates generally to fishing lures and more particularly to a fishing lure having an ordinarily closed flexible bait bag that flexes to open thereby permitting bait to be inserted or removed.

Prior art patents directed to bait bag type fishing lures include U.S. Pat. Nos. 1,816,725 to E. S. Freeman and 2,780,021 to R. M. Fagg. The Freeman lure is shaped like a fish in which the body is a flexible fabric having a zipper for access inside to permit filling the body with bait. The bait bag described in the Fagg patent is essentially an apertured sack that holds the bait and through which the hook extends. The top of the sack is tied by a strap to enclose the bait and to hold the sack to the hook.

SUMMARY OF THE INVENTION

A fishing lure is provided having a bait bag located on or above the shank of the hook. The bag is a hollow resilient body formed by flexible material and has a longitudinal slit along its side that is closed in the absence of an applied force axially inward from the ends of the bag. Application of such a force, as by two fingers and a thumb of the fisherman's hand, opens the slit to allow insertion or removal of bait. The bag is apertured so that the smell and taste of the bait passes into the water adjacent the lure for sensing by fish. In a still-water embodiment of the lure, the barbs of the hook fit into recesses in the exterior of the bag body to avoid snagging the lure. In a further embodiment, a frangible glass container having bait therein is provided in the bag thus permitting a prolonged storage of the lure and bait as for example in a survival kit.

DESCRIPTION OF THE PREFERRED EMBODIMENTS

Figure 1:
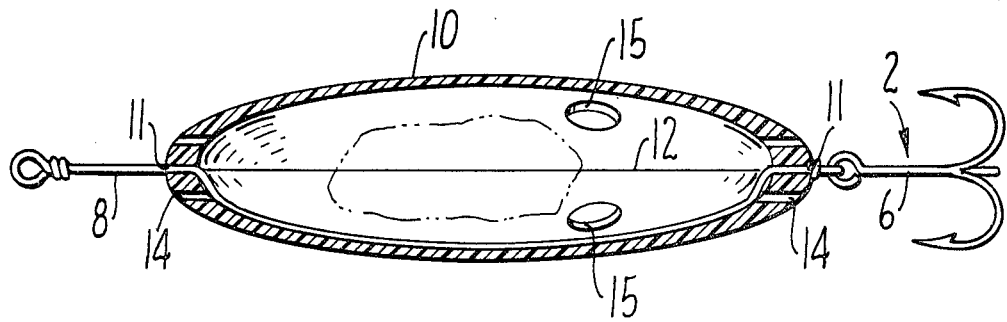
FIG. 1 is a partially cut-away bottom view of one embodiment of the fishing lure of the present invention.
Figure 2:
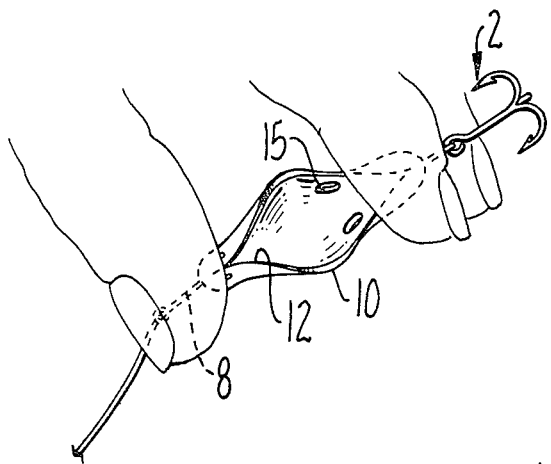
FIG. 2 is a perspective view showing the fishing lure of FIG. 1 being manipulated to open position by hand.
Figure 3:
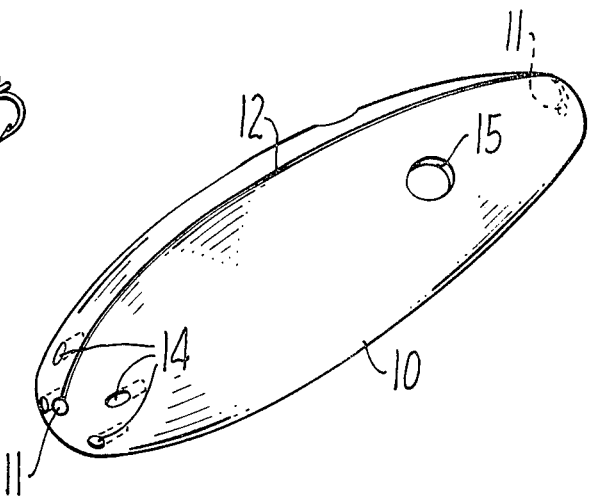
FIG. 3 is a plan view of the hollow resilient body forming a part of the fishing lure of FIG. 1.
Figure 5:
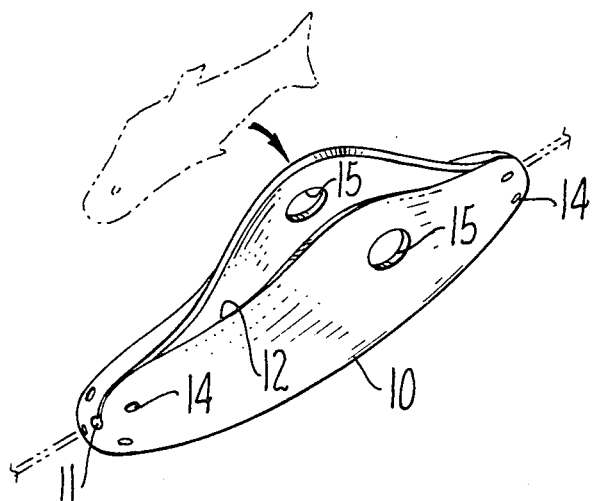
FIG. 5 is a perspective view of the body of FIG. 3 showing the ends compressed to place the body in its open position.
Figure 4:
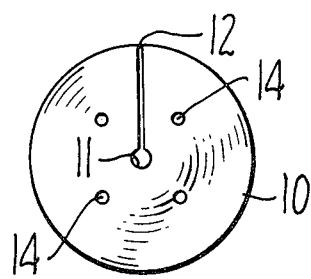
FIG. 4 is an end view of the body of FIG. 3.

Referring now to a first preferred embodiment of the fishing lure according to the present invention as shown in FIGS. 1–5, wherein a bait bag 10, a hollow body of resilient material, is mounted on a length of fishing leader 8 adjacent the shank 6 of a fishing hook 2. Bait bag 10 is a substantially ellipsoidal body having a pair of opposed apertures 11, one located in each end of the longest axis of the body. The end apertures 11 are best seen in FIG. 4 that depicts the forward and aft views of the bait bag 10. A normally closed slit 12 runs the length of the body 10 between apertures 11. The leader 8 is threaded through apertures 11. Alternately the shank 6 of hook 2 may penetrate one or both of apertures 11 thus the leader would be fastened to the shank inside the bag or in the latter instance would not pass through the bag. In FIG. 1 the leader is shown bent to provide more room for bait to be inserted. A plurality of small apertures 14 are located in the ends of bag 10, and a pair of larger apertures 15 are located adjacent slit 12 in a central portion of bag 10. Apertures 14 and 15 permit the bait odor and taste to pass into the adjacent water for luring fish. Application of pressure or force axially inward at the ends of bag 10 causes slit 12 to open as best seen in FIG. 2 where the bag is pressed at or near apertures 11 between two fingers and a thumb. The fisherman's free hand can then be used to insert bait into the interior of the hollow bag. FIG. 5 shows another view of the bag in a flexed, partially open position.

Figure 6:
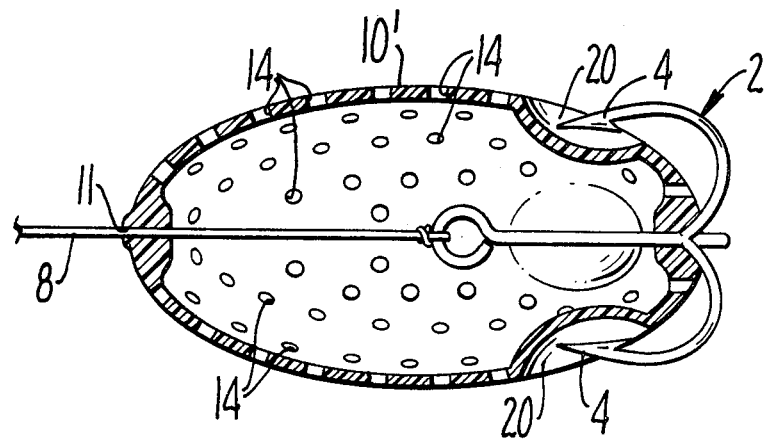
FIG. 6 is a partially cut-away bottom view of a further embodiment of the fishing lure of the present invention.
Figure 7:
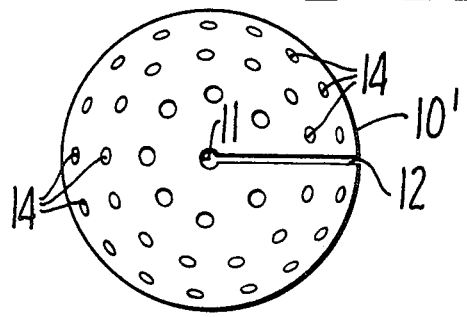
FIG. 7 is an aft end view of the hollow resilient body forming a part of the fishing lure of FIG. 6.
Figure 8:
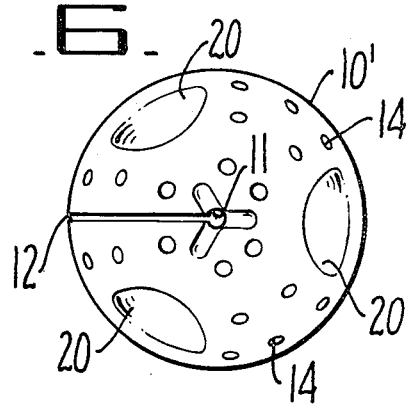
FIG. 8 is a forward end view of the hollow resilient body forming a part of the fishing lure of FIG. 6.

A second preferred embodiment of the fishing lure according to this invention is shown in FIGS. 6, 7 and 8. The lure of this embodiment is intended principally for stillwater fishing and is snag resistant. The bait bag 10' is generally the same as that of the embodiment of FIGS. 1–5. It is, however, somewhat less elongated and has a greater number of apertures and in addition has recess 20 for the barbs 4 of hook 2. The shank 6 of the hook is inserted into one of the end apertures 11 for substantially its entire length so that the barbs generally follow the external contour of the bag and are normally adjacent the recesses 20. Thus when the lure is dragged along a lake bottom, or the like, it will tend to resist snagging on underwater plants or other obstructions. The flexible qualities of bag 10' will permit, however, the fish to engage the barbs when it bites down on the bait bag. Leader 8 is fastened to the hook shank and passes out through the other aperture 11. A greater number of apertures 14 are provided due to the still-water environment in which the lure is intended to be used. It will be apparent that the embodiment of FIGS. 1–5 also may be modified to provide snag resistant barb recesses. Bag 10' has a longitudinal slit 12 and opens in the same manner as does bag 10 of the previous embodiment.

Figure 9:
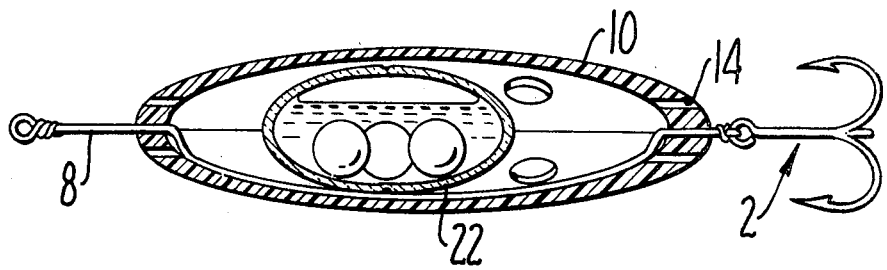
FIG. 9 shows a fishing lure that is a modification of the embodiment of FIG. 1 showing a frangible glass container inside the hollow resilient body.
Figure 10:
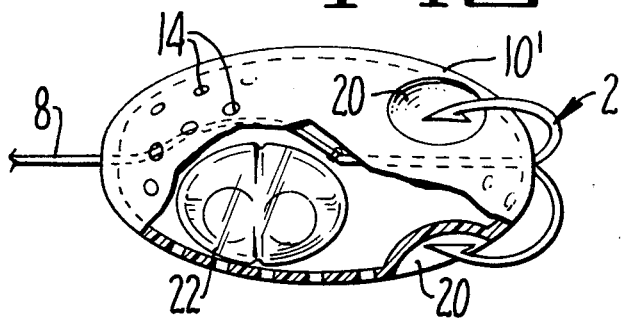
FIG. 10 shows a fishing lure according to the present invention that is a modification of the embodiment of FIG. 6.

In FIGS. 9 and 10 frangible capsules or containers 22 of glass or similar material formed into a sphere or similar enclosure contain bait and are in place within fishing lures of the type as shown in the embodiments of FIGS. 1–5 and 6–8. The bait within the frangible capsules may be, for example, fish eggs immersed in fish oil. Such an encapsulation is susceptible to storage for extended periods and could form a part of a survival kit. Thus in an emergency situation the lure could be used by placing the frangible bait container 22 in the bag 10 or 10' and then breaking the capsule by pressing against the sides of the bag transverse to slit 12.

It will be apparent to those of ordinary skill in the art that modifications may be made to the fishing lure as described herein without departing from the spirit and scope of the invention. For example, the ellipsoidal deformable body 10 or 10' may be of a spherical shape, a special case of an ellipsoidal form. In the claims, ellipsoidal is therefore intended to include spherical Also, the fishing hook employed with the body may have one barb instead of a plurality thereof. The invention is therefore to be limited only by the scope of the appended claims.

I claim:

1. A fishing lure comprising:
a hollow body of resilient material formed in a substantially ellipsoidal configuration, a pair of opposed apertures extending through the end walls of said body and located substantially in the longest axis thereof, a normally closed slit through the side wall of the body and that substantially interconnects said opposed apertures, whereby the application of inwardly directed pressure adjacent said apertures will cause said slit to open to expose and render accessible the internal surface of said body for the placing and removal of bait therein,
a fishing hook having a shank and at least one barb, a leader extending through at least one of said apertures and into the hollow of said body, and means for attaching said leader to said shank, said shank and leader forming an axis passing through the opposed apertures of said hollow body for securing said body thereto.

2. A fishing lure according to claim 1 wherein said leader passes through said body and said shank is attached to said leader outside and to adjacent said body.

3. A fishing lure according to claim 1 wherein there are a plurality of barbs and further comprising a plurality of recesses in said body equal to the number of said barbs, said recesses disposed to engage said barbs, whereby said barbs are not exposed to snag adjacent objects unless said body is deformed.

4. A fishing lure according to claim 3 wherein said shank passes through at least one of said opposed apertures.

5. A fishing lure according to claim 3 wherein said shank passes through one of said opposed apertures and said leader is attached to said shank inside said hollow body.

6. A fishing lure according to claim 1 wherein said hollow body has a plurality of apertures therein whereby bait contained therein is sensed by fish in the water adjacent said lure.

7. A fishing lure according to claim 1 further comprising a frangible capsule contained within said hollow body, said capsule containing bait.

8. A fishing lure comprising:
a hollow body of resilient material formed in a substantially ellipsoidal configuration, a pair of opposed apertures extending through the end walls of said body and located substantially in the longest axis thereof, a normally closed slit through the side wall of the body and that substantially interconnects said opposed apertures, whereby the application of inwardly directed pressure adjacent said apertures will cause said slit to open to expose and render accessible the internal surface of said body for the placing and removal of bait therein,
a fishing hook having a shank and at least one barb, said shank extending through at least one of said apertures and into the hollow of said body for securing said body to said shank.

* * * * *